United States Patent [19]

Yamada

[11] Patent Number: 5,213,865
[45] Date of Patent: May 25, 1993

[54] ANTISTATIC MAT

[75] Inventor: Kohei Yamada, Gifu, Japan

[73] Assignee: Daiwa Co., Ltd., Gifu, Japan

[21] Appl. No.: 758,259

[22] Filed: Aug. 26, 1991

Related U.S. Application Data

[63] Continuation of Ser. No. 373,995, Jun. 29, 1989, abandoned.

[30] Foreign Application Priority Data

| Jul. 2, 1988 | [JP] | Japan | 63-165472 |
| Aug. 28, 1988 | [JP] | Japan | 63-213886 |
| Oct. 8, 1988 | [JP] | Japan | 63-254469 |
| Oct. 8, 1988 | [JP] | Japan | 63-254470 |

[51] Int. Cl.$^5$ .................... B32B 3/02; B32B 33/00; D02G 3/00; D02G 3/02
[52] U.S. Cl. ............................ 428/92; 428/97; 428/373; 428/379; 428/399; 428/400; 57/210; 57/232; 57/244; 57/901; 57/905
[58] Field of Search ................ 428/92, 373, 372, 379, 428/400, 399, 389, 97; 57/901, 905, 244, 210, 232

[56] References Cited

U.S. PATENT DOCUMENTS

| 3,672,929 | 6/1972 | Riordan | 428/92 |
| 3,678,675 | 7/1972 | Klein | 428/361 |
| 3,775,228 | 11/1973 | Leary | 428/400 |
| 3,778,331 | 12/1973 | Scharf | 428/95 |
| 3,795,919 | 1/1974 | Hickman | 428/400 |
| 3,803,453 | 4/1974 | Hull | 428/373 |
| 3,823,056 | 7/1974 | Cooney | 428/95 |
| 4,061,811 | 12/1977 | Takase et al. | 428/95 |
| 4,154,881 | 5/1979 | Hirakawa et al. | 428/95 |
| 4,770,915 | 9/1988 | Nakagawa et al. | 428/373 |
| 4,857,404 | 8/1989 | McCullough, Jr. et al. | 428/373 |

FOREIGN PATENT DOCUMENTS

WO84/03723 9/1984 PCT Int'l Appl. .

OTHER PUBLICATIONS

European Search Report (date of search Oct. 11, 1989).

*Primary Examiner*—George F. Lesmes
*Assistant Examiner*—Terrel Morris
*Attorney, Agent, or Firm*—Lorusso & Loud

[57] ABSTRACT

This invention relates to an antistatic mat for a vehicle, and especially relates to an antistatic mat equipped with electric discharge function against generation of static electricity for effectively preventing adhesion of dust and rubbish thereon and secondary disaster caused by electric shock. An antistatic mat according to Claim 1 is characterized in that it includes: pile including conductive fibers containing conductive components partially protruding from the surface of synthetic resin. An antistatic mat according to Claim 2 is characterized in that it includes conductive compound fibers wound around non-conductive fibers forming pile in the manner that each conductive fiber is wound around the periphery of each non-conductive fiber to form a spiral shape. An antistatic mat according to Claim 3 is characterized in that it includes conductive compound fibers mixed to the bundle of non-conductive fibers forming pile. An antistatic mat according to Claim 4 is characterized in that it includes: a core member formed by focusing fibrous conductive compound fiber provided in the center of the fiber; and a sheath member composed of non-conductive synthetic resin surrounding and covering the core member. The conductive components are disposed centrally and constitute the core member, said conductive components being partially cut away at the end portion of the conductive components and protruding from the surface of the fiber. An antistatic mat according to Claim 5 is characterized in that the conductive compound fibers are formed by mixing fibrous conductive components with non-conductive components composed of non-conductive synthetic resin, and the conductive components are partially protruding from the surface of the fiber. An antistatic mat according to Claim 6 is characterized in that it includes pile including conductive components protruding from one surface of the synthetic resin; and a conductive layer composed of conductive material and provided between pile and base cloth in the state that the conductive layer contacts with the conductive compound fibers.

6 Claims, 4 Drawing Sheets

ANTISTATIC MAT

This is a continuation of copending application Ser. No. 07/373,995, filed on Jun. 29, 1989, now abandoned.

BACKGROUND OF THE INVENTION

This invention relates to an antistatic mat for vehicles, and more particularly relates to an antistatic mat equipped with electric discharge function against generation of static electricity for effectively preventing adhesion of dust and rubbish thereon and secondary disaster caused by electric shock.

Conventionally, it is proposed an antistatic mat as disclosed in Published Unexamined Japanese Patent Application No. 61-110632, and the antistatic mat as above is designed to prevent mat from being soiled due to attraction of dust and rubbish caused by generation of static electricity and due to secondary disaster caused by electric shock.

The antistatic mat (1) as above according to the prior art as shown in FIG. 11, includes conductive base cloth (2) partially including conductive thread therein, a connecting cord (3) for electrically connecting one end of the antistatic mat (1) with a vehicle body. According to the antistatic mat (1) of this prior art, another end of the connecting cord (3) is connected to the vehicle body for enabling to earth static electricity caused by friction generated between shoes and the bottom of the trousers to the vehicle body at the time of getting on or off of the vehicle or during driving of the vehicle.

The antistatic mat (1) according to the prior art as above, however, the generated static electricity is earthed to the vehicle body by the provision of the cord (3) connected to one end portion of the mat. Therefore, when the mat becomes depositioned due to getting on and off the vehicle and the connecting cord becomes disconnected from the vehicle body, earthing will be frequently made disabled.

Furthermore, the connected cord (3) as above needs provision of mounting portion where earthing is capable in the vehicle body. In addition to that, for earthing static electricity in the electrified body, earthing means such as earth belt should be provided to the vehicle body, since the body of the vehicle does not contact with the ground surface directly.

The present invention is considered for overcoming the defects of the prior art as above, and this invention is to provide an antistatic mat equipped with electric discharging function against generation of static electricity for effectively preventing adhesion of dust and rubbish to the vehicle mat and to secondary disaster caused by electric shock.

SUMMARY OF THE INVENTION

An antistatic mat according to Claim 1 is characterized in that it includes: pile including conductive fibers containing conductive components partially protruded from the surface of synthetic resin.

An antistatic mat according to Claim 2 is characterized in that it includes conductive compound fibers wound around non-conductive fibers forming pile in the manner that each conductive fiber is wound around the periphery of each non-conductive fiber to form a spiral shape.

An antistatic mat according to claim 3 is characterized in that it includes conductive compound fibers mixed to the bundle of the non-conductive fibers forming pile.

An antistatic mat according to claim 4 is characterized in that it includes: a core member formed by focusing fibrous conductive compound fibers provided in the center of the fiber; and a sheath member composed of non-conductive synthetic resin surrounding and covering the core member. The conductive components disposed centrally and constituting the core member are partially cut away the end portion of the conductive components and protruded from one surface of the fiber.

An antistatic mat according to claim 5 is characterized in that the conductive compound fibers are formed by mixing fibrous conductive components with non-conductive components composed of non-conductive synthetic resin, and the conductive components are protruded from the surface of the fiber.

An antistatic mat according to claim 6 is characterized in that it includes pile including conductive components protruded from one surface of the synthetic resin; and a conductive layer composed of conductive material and provided between pile and base cloth in the state that the conductive layer contacts with the conductive compound fibers.

A first object of the present invention as claimed in claim 1 is to provide an antistatic mat which enables atmospheric discharge of static electricity caused by friction generated between shoes and the bottom of trousers by means of the conductive components protruded from the surface of the synthetic resin fibers of the conductive compound fibers.

A second object of the present invention as claimed in claim 2 is to provide an antistatic mat which enables atmospheric discharge of static electricity generated because of friction between shoes and the bottom of trousers by means of the conductive compound fibers which are wound around non-conductive fibers forming pile in the spiral shape. Furthermore, by forming spiral conductive compound fibers wound around non-conductive fibers, the conductive compound fiber is reinforced by the non-conductive fiber.

A third object of the present invention as claimed in claim 3 is to provide antistatic mat which enables atmospheric discharge of static electricity generated because of friction between shoes and the bottom of the trousers by means of the conductive compound fibers mixed into the focused bundle of the non-conductive fibers forming pile. According to this invention, the conductive compound fibers mixed and protected within focused bundle of non-conductive fibers are free from being damaged, in spite of frequently generated friction between shoes and the bottom of the trousers.

A fourth object of the present invention as claimed in Claim 4 is to provide an antistatic mat in which conductive compound fibers included in the pile are made by focusing fibrous electoconductive components forming the core member disposed centrally in the fiber in the manner that each conductive compound fiber is in contact with each other, the conductive components are partially cut away so that at least one conductive component becomes protruded at the surface of the sheath member made of synthetic resin. According to this invention, static electricity generated by friction or other causes is transmitted to other conductive components forming the core member by means of the conductive compound fibers protruded from the surface of fabric, performing conductivity and electric discharge function.

A fifth object of the present invention is to provide an antistatic mat free from being damaged at the surface and and excellent in the points of physical constants such as strength, since the conductive components are mixed to non-conductive synthetic resin in the conductive compound fibers. According to this invention, conductivity and electric discharge function are resulted by the conductive components protruded from the surface of the fibers.

A sixth object of the present invention is to provide an antistatic mat in which the conductive layer made of conductive material and provided between the pile and the base cloth performs atomspheric discharge of static electricity caused by friction generated between shoes and trousers at the time of getting on and off the vehicle or during driving or so. In this invention, static electricity is atomspherically discharged by the conductive compound fibers protruded from the surface of the fibers included in the pile of the base cloth provided in the manner that the base cloth contacts with the conductive layer.

Other objects and aspects of the invention will become apparent from the following description together with the drawings and example below.

DESCRIPTION OF THE PREFERRED EMBODIMENT

At the outset, the invention is described in its broadest overall aspects with a more detailed description as follows.

Figure 1:
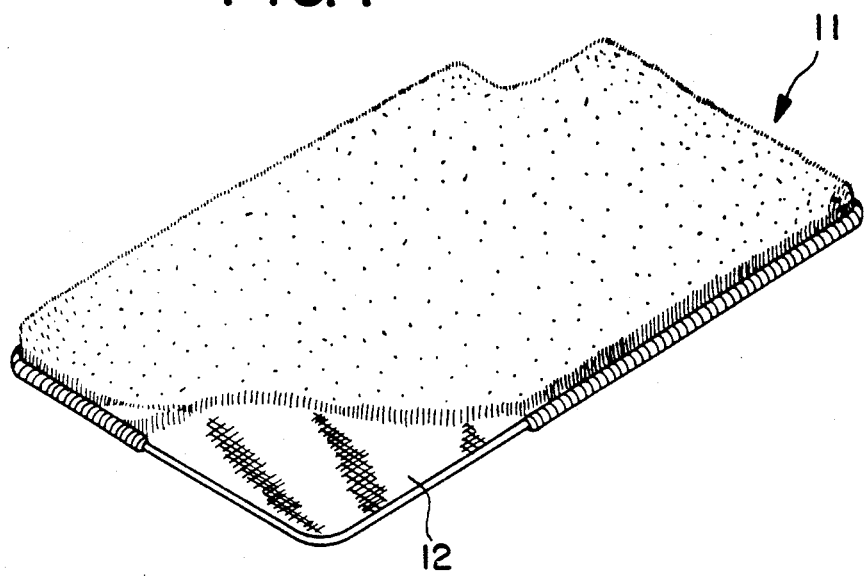
FIG. 1 is a perspective view showing an antistatic mat according to the present invention.
Figure 2:
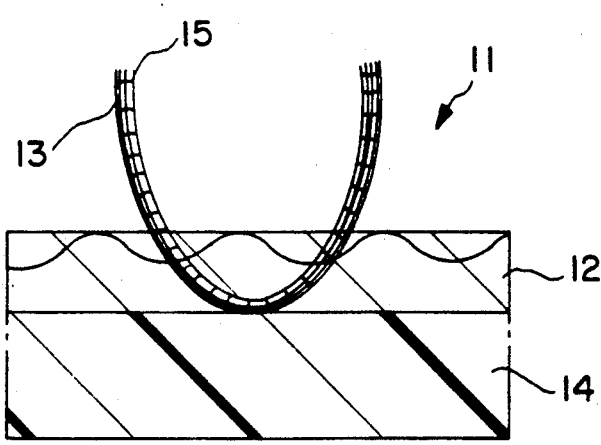
FIG. 2 is an enlarged cross-sectional view showing main sections of the antistatic mat.

Referring to FIGS. 1 and 2, the antistatic mat (11) according to the present invention includes a base cloth (12), a pile (13) forming a predetermined volume on the base cloth (12), and a backing up material (14) for fixing the pile (13) to the base cloth (12).

The base cloth (12) may be made by cutting a fabric such as non-woven fabric, a mesh, and a nylon fabric or the like to a predetermined shape. In this embodiment, non-woven fabric is used as a base cloth (12). A plurality of hairs of pile (13) are provided on the base cloth (12) in the manner that each end of pile hair penetrates through and protrudes from the rear surface of the base cloth (12). Example of such pile (13) is made by focusing and bundling a plurality of non-conductive fibers such as nylon fibers so that each pile hair has a predetermined diameter. In this pile (13) as mentioned hereinabove is included conductive compound fibers (15), which is one of the gists of the present invention such that each conductive compound fiber (15) is wound around each non-conductive fiber to form a spiral shape or such that conductive compound fibers are mixed within the bundle of the non-conductive fibers.

The conductive compound fibers (15) as above are featured in that they possess both conductivity and electric discharge functions, while attaining a predetermined strength of the fiber (15).

Figure 3:
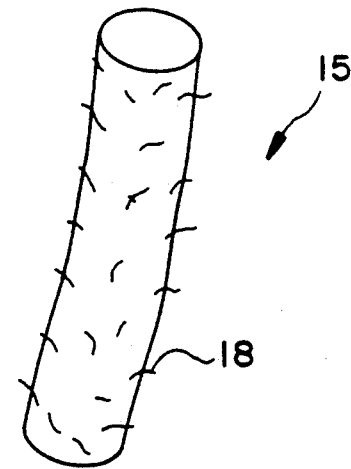
FIG. 3 is a perspective view of the conductive compound fibers included in the pile of the antistatic mat according to the present invention.
Figures 4, 5:
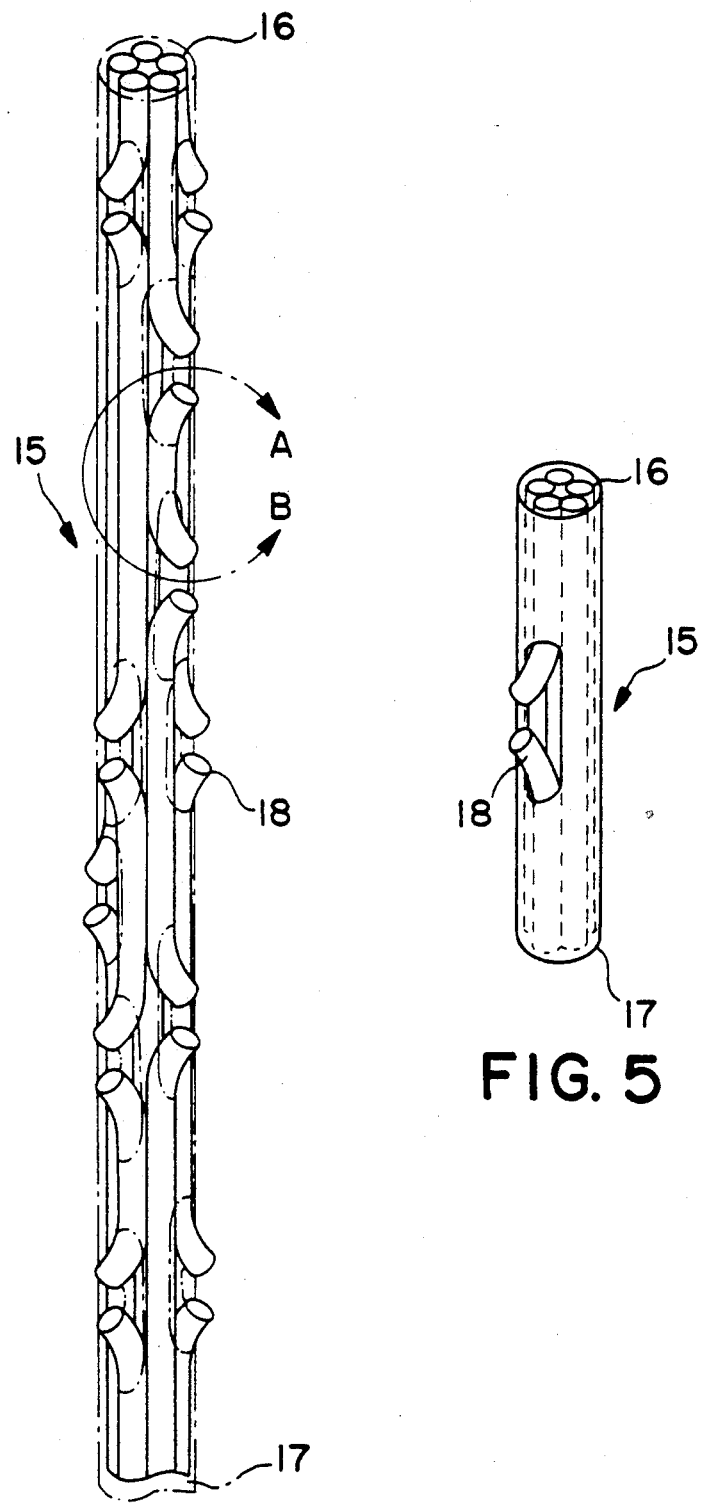
FIG. 4 is a partially enlarged perspective view of the conductive compound fibers according to the present invention.
FIG. 5 is an enlarged perspective view showing main sections enclosed within line A-B.

In this embodiment, the conductive compound fiber (15) is composed of a core member (16) and a sheath member (17), as shown in FIGS. 3 through 5.

The core member (16) is formed by focusing fibrous conductive components. The example of fibrous conductive component (18) is formed by mixing conductive powder such as powdery carbon, simple substance of metal and like, oxidized metal such as tin oxide and zinc oxide, or metallic compound such as copper sulfide and zinc sulfide with thermoplastic polymer such as polyethylene, polypropylene, polystyrene, polybutadiene, polyisoprene, nylon-6, nylon-66, polyethylene terephthalate, polybutylene terephthalate to perform melt spinning.

The compound ratio of conductive powder with thermoplastic polymer depends on the kinds of adopted conductive powder, however, most preferably 3:1 by weight ratio. If conductive power is added excessively, the conductive power can not be effectively mixed with polymer, and therefore it is required to determine appropriate mixing amount depending on the case. A plurality of the conductive components (18) preferably 3 to 5) in number, formed in the manner as above, are focused to form the core member (16). The core member (16) is disposed centrally in the manner that the sheath member (17) covers the core member (16).

Any fiber forming non-conductive synthetic resin is available for the sheath member (17). Preferable fiber is a polyamide such as nylon-6, nylon-66, or nylon-12, polyester acrylic polymer such as polyethylene phthalate or polybutylene terephthalate or polyolefine such as polyulethane and polyplopylene. The fiber having core and sheath structure is made in the manner that non-conductive resin surround and coat the core member (16) formed by focusing electroconductive components (18). Coating of the core member (16) by the sheath member (17) may be made based on any conventionally proposed method. In this embodiment, it is adopted a method by melting non-conductive resin forming the sheath member (17), soaking the core member (16) in the melted fluid of non-conductive resin, impregnating the conductive components forming the core member (16) as well as the surface of the core member (16) with resin, and cooling and solidifying non-conductive resin to form the coating layer of the non-conductive resin.

The conductive compound fiber (15) having a core and sheath structure is partially cut away and one part of the core member (16) disposed centrally within the fiber is partially protruded from the surface of the fiber. In this embodiment, spark cutter is used for cutting fibers, although any other method is available. The spark cutter is performed in the condition that fabric is moved at the speed of 5 m/min. -10 m/min. by exerting tension constantly thereon and igniting under the voltage of 10 Kv-20 Kv. The depth of cutting depends on thickness of the sheath member (17), however, at least one of the conductive components (18) forming the core member (17) disposed in the center of the fiber should be cut. As a result, it is preferable to form substantially thinner sheath member (17) to cover the core member (16). However, to form totally thinner sheath member (17) around the core member leads to deterioration in strenth and stretching characteristic of the fiber. Because of the reason as mentioned hereinabove, the sheath member (17) should be formed having adequate thickness so that fiber provides strength and stretching characteristics.

In the fiber in which cutting is finished, one part of the conductive components (18) forming the core member (16), especially the top end and/or the peripheral portion of the conductive components (18) disposed outwardly, projects from the surface of the fiber, thus presenting raising appearance totally on the fibers. In addition to cutting of the conductive components of the core member (16), the sheath member (17) includes a partially scooped out portion extending centrally from the projecting portion of the conductive components (18). According to this embodiment, the outer surface of the sheath member (17), that is, the outer surface of non-conductive resin forming the sheath member (17) is removed by means of solvent. As a result, the fiber is totally made substantially thinner than that at the time cutting of the fiber is performed. The thinner fiber the larger the protruded parts of conductive component of the sheath member, whereby conductivity and electric discharge function are both improved. Removal of the sheath member (17) by means of solvent may be performed based upon any conventional method using solvent. In the present invention, the sheath member is removed by passing the cut fibers in the atmosphere of the solvent.

Figure 6:
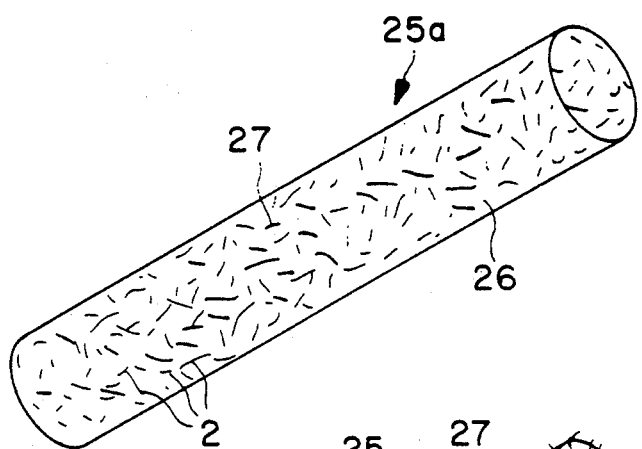
FIG. 6 is an enlarged perspective view showing another embodiment of the conductive compound fiber.
Figure 7:
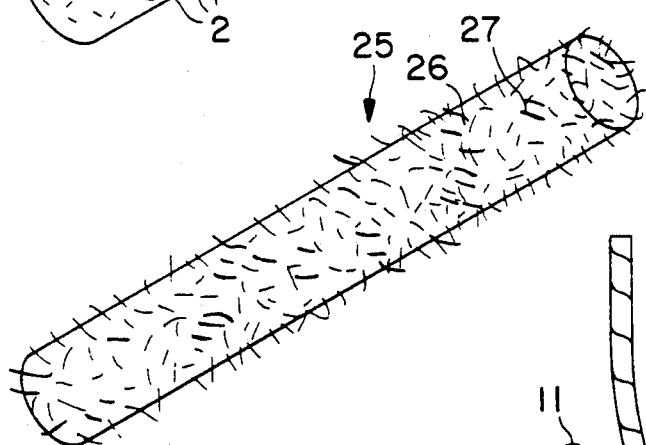
FIG. 7 is an enlarged perspection of the fiber shown in FIG. 6, in which the outer surface of the fiber is melted.

Another example of the preferable conductive compound fiber is shown in FIG. 6.

The conductive compound fibers (25) in this example are made by mixing non-conductive components (26) composed of non-conductive synthetic resin with fibrous conductive components (27) and perform melt spinning of the above mixture. On the surface of the fiber is projectingly provided at least one of the conductive components (27). The conductive components (25) are made by mixing non-conductive components (26) composed of melt spinable non-conductive synthetic resin such as nylon, polyester, polypropylene, or polyethelene with conductive component (27) composed of fibrous carbon, simple substance of metal, oxdized metal such as tin oxide and zinc oxide, or a metallic compound such as copper sulfide and zinc sulfide and formed in substantially thinner denier than the conductive compound fiber (25), by cutting in a predetermined length, performing melt spinning in the condition that the mixing ratio of the fibrous conductive components (27) occupy not more than 10% of the total weight of the fibers, and melting the outer surface of the conductive compound fibers (25).

The conductive compound fiber (25) formed as above presents an appearance that a plurality of fibrous conductive components (27) is raised by projecting the conductive compound fibers (27) from the surface.

For producing the conductive compound fibers (25) as above, a chip made of melt spinnable non-conductive synthetic resin such as nylon, polyester, polyprophyrene, or polyethylene is prepared.

On the other hand, the conductive components (27) are prepared being composed of fibrous carbon, a simple substance of metal or the like, oxidized metal such as tin oxide or zinc oxide, or metallic compound such as copper sulfide or zinc sulfide and formed into substantially thinner denier than the conductive compound fiber (27). If the conductive component (27) is excessively thick, the produced conductive compound fibers (25) present an interior appearance and less preferable physical constants.

The conductive components (27) should be cut in the length equal to or less than 5 mm, considering diffusion at the time of mixing, preferable appearance of the conductive components (25) and stable physical constants and conductivity.

Subsequently, the synthetic resin as non-conductive components (26) is mixed to the conductive components (26) so that the conductive components occupy not more than 10% of the non-conductive components. The mixing ratio as above is for attaining good appearance of the produced conductive compound fibers (25) and preferable characteristics similar to those of the non-conductive components (26), for example, physical constants, as well as enhancing stability in the spinning process.

Subsequently, mixing of the above non-conductive components (26) with the conductive components (27) and spinning the mixture (a primary process) is performed.

One of the well-known spinning methods as above is melt spinning method, and according to this method, the non-conductive components (26) to which the conductive components (27) are mixed are melted by applying heat, extruded from the small slots for spinning, and drafted upon solidification by cooling so that each fiber possesses physical constants. In the prosecution of this melt spinning, it is preterable that the melting point of the conductive components (27) is higher than that of the synthetic resin forming non-conductive components (26) at least by 100° C.

Another example of well-known spinning method is extrude spinning method. According to this extrude spinning method, the electroconductive component (27) with which the conductive components (27) are mixed are heated until the temperature of the non-conductive components (26) becomes the softening point, which is lower than the melting point of the resin, to extrude the mixture from the slots, when the thermal decomposition of synthetic resin forming the non-conductive components (26) is started from the melting point.

An example of still another spinning method is the wet spinning method. According to this method, the synthetic resin (as conductive components) is dissolved in the solvent to obtain spinning fluid and the spinning fluid is extruded as filaments through slots into the solid bath for solidifying the fluid. The filaments produced as above are drafted and dried by applying heat.

As shown in FIGS. 2, in each spinned fiber (25a) (spinned based upon either spinning method explained hereinabove), the conductive components (27) are partially exposed on the surface thereof and the conductive components (27) are wound around and contact with each other, the resulting fibers becoming totally equipped with conductivity. The fiber (25a) (spinned based upon either method as above) is featured in low mixing ratio of the conductive components (27), whereby the resulting fiber expresses similar physical constants, for example, strength as fiber solely composed of the non-conductive components (26). The spinned fibers (25a) as above, however, is deteriorated in view of conductivity, since the portion where the conductive components are exposed is narrow.

For enhancing conductivity of the fiber (25a) as above, the following process (a secondary process) is performed.

By melting only non-conductive components (26) at the surface of each spinned fiber (25a) made according to either one of the above-mentioned spinning methods to obtain slightly thinner fibers (25a), the conductive components (27) are made partially protruding from the surface of the conductive fiber (25).

An example of the method of this secondary process is to prepare a solvent which dissolves the synthetic resin forming the non-conductive components (26) but which is unable to dissolve the conductive fiber composed of conductive components, and to pass the spinned fiber (25a) in an atmosphere of the constant density of the solvent. Another example of this secondary process is to pass the spinned fiber (25a) through solution including the solvent.

By the secondary process as above, the exposed portion of the conductive components (27) at the surface is increased at the surface and conductivity is greatly improved, although the production process is simple and production cost is low. Furthermore, the secondary process eliminates damage to the spinned fiber (25a) and crack formation thereon. Therefore, the conductive component fibers (25a) made by adopting the secondary process show almost the same physical constants, for example, strength etc. as that of the fiber before receiving this process.

The antistatic mat (11) according to the present invention is made by providing pile (13) including conductive compound fiber (15) having conductivity and electric discharge function, as shown in FIGS. 2-5 with the base cloth (12) in which the rear surface is reinforced by the backing material (14) made of synthetic resin such as vinyl chloride resin. The anititstatic mat (11) having a structure as above enables to eliminate static electricity generated by friction caused by shoes through the conductive compound fibers (15) included in the pile (13).

Hereinunder is description of the antistatic mat claimed in claim 6, wherein conductivity and electric discharge function are further enhanced by the provision of the conductive layer.

Figure 8:
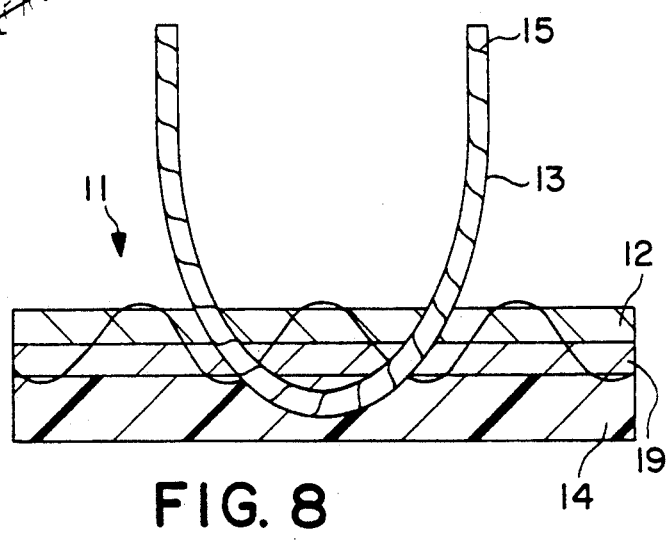
FIG. 8 is an enlarged cross-sectional view showing another embodiment of the present invention.

Referring to FIG. 8, a conductive layer (19) is made by protruding the above-mentioned conductive material such as carbon fiber from the surface of the conductive layer (19) composed of conductive material for the purpose of atomspheric discharge of the static electricity.

An example of such conductive layer (19) is disclosed in the publication of Published Unexamined Japanese Patent Application No. 62-15639. The conductive layer (19) as above is composed of 3-15 weight % of short hair carbon fiber, 20-70 weight % of short hair fiber of synthetic resin, and remaining weight % of wood pulp, preferably paper having properties of half-value period equal to or less than 5 minutes and triboelectrified voltage equal to or less than 40 V. The paper used in this embodiment is made by mixing 5 weight % of 1 d×6 mm short hair carbon fiber produced from acrylonitrile polymeric fiber made based upon a conventional method, 35 weight % of 1 d×6 mm short hair polyethelene terephthalate fiber wood pulp, and 15 weight % of binder to cut the above mixture by means of a beating machine for obtaining finer and homogeneous mixture produced by adopting wet paper forming method. The conductive material composed of carbon fiber is protruded irregularly from the surface of the conductive layer (19) perpendicularly of slantingly. By protruding the top end made of conductive material composed of carbon fiber by not less than 50 hairs/cm$^2$ from the surface of the conductive layer (19), static characteristic is sufficiently achieved.

The above-mentioned material is not limited to the conductive layer (19), and various materials which are produced at any process for forming antistatic mat are available.

Referring to FIG. 8, the method for producing the antistatic mat includes applying backing up material composed of thermoplastic resin in the solid condition. In this embodiment, vinyl chloride is applied onto the metal form (not shown) capable of heating and cooling. Subsequently, the metal form (not shown) is heated from the bottom surface thereof to change the backing up material (14) to semi-gel condition. Carbon material such as powdery, granular, or short fibrous carbon material and conductive material such as conductive ceramics and metals are spread or laid on the backing material (14) in the semi-gel condition in the manner that the backing up material contacts with the above conductive material. A plurality of compound fibers such as carbon fibers, conductive ceramic fibers, and metallic fibers are added to and bundled together with a plurality of nylon fibers (15) to form pile (13) so that each hair of pile (13) has a predetermined thickness by twisting a plurality of hairs of pile each having a predetermined thickness together with a plurality of hair of nylon fibers. The resulting pile (13) is provided to the base cloth (12) so that each hair of pile (13) having a predetermined thickness penetrates through the rear surface of the base cloth (12). The base cloth (12) is placed in the manner that the connected end of each hair of pile (13) is arranged within the conductive material for enabling contact between the conductive compound fiber (15) and conductive material. The backing up material (14) in the solid condition, as mentioned hereinabove permeate within the conductive material. By heating and cooling the metal form (not shown) directly from the bottom surface thereof, the backing material (14) for producing the antistatic mat according to the present invention is changed into rubber like gel condition for producing the antistatic mat in which the conductive layer (19) is formed between pile layer (13) and backing up material (14).

By the provision of the conductive layer (19) as above within the antistatic mat (11), conductivity and electric discharge function are greatly improved.

Figure 9:
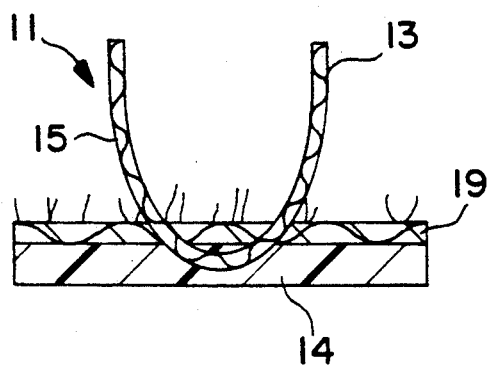
FIG. 9 is an enlarged cross-sectional view of the further embodiment of the present invention showing main sections of the static mat.

As shown in FIG. 9, it may be available another embodiment in which the conductive layer (19) forms the base cloth. In this embodiment in which the conductive layer (19) is exposed at the surface greatly improves electric discharge function.

Figure 10:
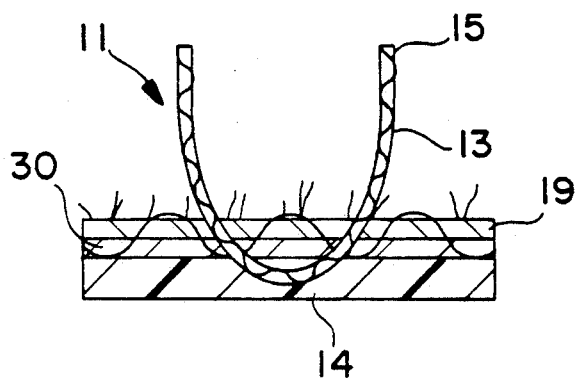
FIG. 10 is an enlarged cross-sectional view of the antistatic mat according to still further embodiment of the present invention showing main sections of the static mat.
Figure 11:
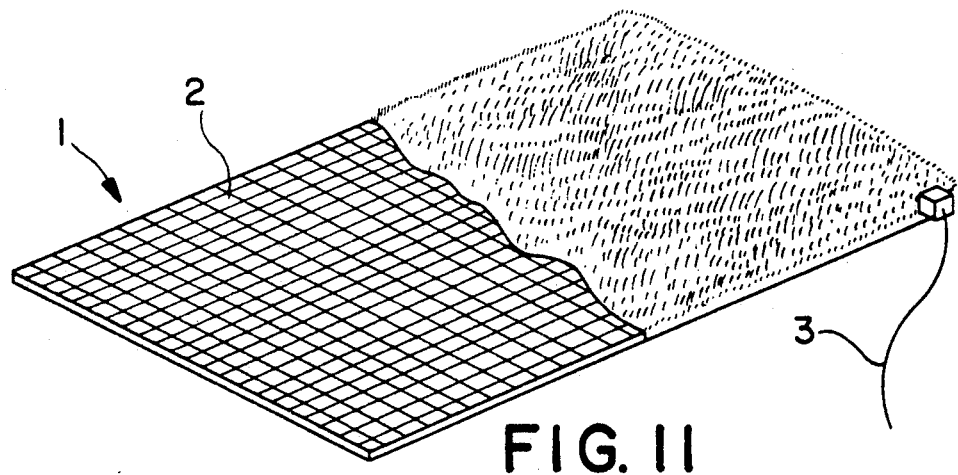
FIG. 11 is a perspective view of the static mat according to the prior art.

As shown in FIG. 10, it may be also available still another embodiment in which reinforcing sheet made of knitting, fabric, or non-woven fabric is adhered to and piled on one side surface of the conductive layer (19). The antistatic mat structured as above according to this embodiment enables to prevent occurrence of any injury to the human body and damage to the product caused by friction generated when the mat becomes in contact with other objects or touched by hand during the manufacturing of mats (1).

The antistatic mat according to Claim 1 enables atmospheric discharge of static electricity generated because of friction generated between shoes and the bottom of the trousers by means of the conductive components protruded from the surface made of synthetic resin of the conductive compound fibers. In the mat structured as above, atmospheric discharge of static electricity would not be influenced by deposition of mat while static electricity is effectively and surely eliminated. As a result, the mat as above needs no attachment or accessory, such as connecting cord or earthing belt for eliminating static electricity and the mat itself becomes available as a simple means to eliminate static electricity.

The antistatic mat according to Claim 2 enables atmospheric discharge of static electricity caused by friction generated between shoes and the bottom of the trousers by means of the conductive compound fibers wound together with and around non-conductive compound fibers forming pile in the spiral shape. By winding conductive compound fiber together with and around non-conductive fiber in the manner that the conductive compound fiber forms spiral shape, conductive compound fiber becomes reinforced with non-conductive compound fibers.

The antistatic mat structure as above, is free from damages and abrasion of conductive compound components, and the durability of the conductivity and the term that the electric discharge function is maintained are both extended.

As a result, the antistatic mat according to Claim 3 enables atmospherical discharge of static electricity caused by friction generated between shoes and the bottom of the trousers by means of conductive compound fibers mixed into the focused bundle of non-conductive fibers forming pile. According to the antistatic mat as above in which the conductive compound fibers are mixed into and protected within the bundle of non-conductive compound fibers, the conductive compound fibers are prevented from coming off and protected from abrasion frequently occurring between the shoes and the bottom of the trousers.

Therefore, damages to or abrasion of the conductive components that effect badly on conductivity and electric discharge function are eliminated, whereby duration in which conductivity and electric discharge function are maintained is extended.

In the antistatic mat according to claim 4, each conductive compound fiber included in the pile is making contact with each other by focusing the fibrous electroconductive components forming a core member disposed centrally within the fiber, while the conductive components are partially cut away and protrude from the fiber surface of a sheath member composed of non-conductive synthetic resin. Accordingly, the static electricity caused by friction is carried by conductive components protruding from the surface and transmitted to other conductive components forming the core member, expressing conductivity and electric discharge function.

Therefore, duration in which conductivity and electric discharge function are maintained is extended.

The antistic mat according to Claim 5, in which the conductive compound fibers included in the pile are formed by mixing conductive compound fibers with non-conductive synthetic resin eliminates damages formed on the surface and expresses excellent physical constants, for example, strength. Furthermore, conductivity and electric discharge function are obtained by the conductive components protruding from the fiber surface.

Because of this, even though the conductive compound fibers are partially worn out, conductivity does not deteriorate and duration in which conductivity and discharge function are maintained is prolonged.

The antistatic mat according to Claim 6 enables atmospheric discharge of static electricity caused by friction generated between shoes and the bottom of the trousers at the time of getting on and off the vehicle and during driving by means of conductive layer made of conductive material and provided between pile and backing up material, and therefore static electricity atmospherically discharged by conductive layer is further discharged atmospherically by means of conductive components protruding from the surface of the conductive compound fibers included in the pile of the base cloth provided in contact with the conductive layer.

According to the structure as above, static electricity is effectively eliminated.

What is claimed is:

1. An antistatic mat comprising: a base cloth and a predetermined volume of pile, which pile penetrates through and protrudes from said base cloth, said pile being secured to said base cloth by a backing material, said pile comprised of conductive compound fibers whereby each of said conductive compound fibers comprises a core comprising a bundling of conductive components and a non-conductive resin surrounding said core to form a sheath, whereby a portion of said conductive components protrudes from the surface of said sheath.

2. The antistatic mat of claim 1, wherein said bundling of conductive components are fibrous and partially cut so that the top of each of said conductive components protrudes from the surface of said sheath.

3. The antistatic mat of claim 1 said pile further comprising non-conductive fibers, wherein said conductive compound fibers are wound around said non-conductive fibers, said pile thereby having a spiral shape.

4. The antistatic mat of claim 1, said pile further comprising non-conductive fibers, wherein said non-conductive fibers are intermixed with said conductive compound fibers.

5. An antistatic mat comprising: a base cloth and a predetermined volume of pile, which pile penetrates through and protrudes from said base cloth, said pile being secured to said base cloth by a backing material, said pile comprised of conductive compound fibers whereby each of said conductive compound fibers comprises a core comprising a bundling of conductive components and a non-conductive resin surrounding said core to form a sheath, whereby said sheath is formed to permit a portion of said conductive components to protrude from the surface thereof, the antistatic mat further comprising a layer of conductive material provided between said pile and said backing material, so that said layer of conductive material contacts said conductive compound fibers of said pile.

6. An antistatic mat comprising: a base cloth and a predetermined volume of pile, which pile penetrates through and protrudes from said base cloth by a backing material, said pile comprised of conductive compound fibers comprising a mixture of conductive components and non-conductive synthetic resin, whereby said conductive components protrude from the surface of each of said conductive compound fibers by means of a solvent which removes said non-conductive resin from the surface of said conductive compound fibers.

* * * * *